United States Patent [19]

Lybecker

[11] 4,256,219
[45] Mar. 17, 1981

[54] CABLE OR CHAIN ACTUATED CHIP CONVEYOR

[76] Inventor: G. Wayne Lybecker, 123 Clair Hill Dr., Rochester, Mich. 48063

[21] Appl. No.: 60,018

[22] Filed: Jul. 23, 1979

[51] Int. Cl.³ .............................................. B65G 25/04
[52] U.S. Cl. ..................................... 198/747; 198/748; 198/749
[58] Field of Search ............... 198/749, 748, 727, 718, 198/719, 839, 747, 750, 772; 414/214, 198; 74/27, 28; 254/178; 242/201, 203

[56] References Cited

U.S. PATENT DOCUMENTS

| | | | |
|---|---|---|---|
| 147,523 | 2/1874 | Stearns | 83/709 |
| 937,192 | 10/1909 | Starr | 198/736 |
| 1,934,835 | 11/1933 | Weiss | 198/859 |
| 2,752,629 | 6/1956 | Hammond | 198/748 X |
| 3,112,025 | 11/1963 | Peras | 198/749 |
| 3,659,701 | 5/1972 | Taccome | 198/749 |
| 3,738,514 | 6/1973 | Jones | 414/57 |
| 3,797,637 | 3/1974 | Wissmann | 198/749 X |

Primary Examiner—Robert B. Reeves
Assistant Examiner—Douglas D. Watts
Attorney, Agent, or Firm—Basile, Weintraub & Hanlon

[57] ABSTRACT

A cable or chain actuated chip conveyor for moving chips along a trough is disclosed. A trough is employed to collect chips from various operations and a harpoon is employed to move the chips along the trough to a point where they are collected for disposal. The harpoon is shaped so that when moving in a second direction through a pile of chips it passes through the chips without displacing the chips in the direction of movement of the harpoon, and when moving in a first direction the harpoon displaces the chips in the direction of movement of the harpoon. A cable or chain driven by a capstan is employed for urging the harpoon in the first direction and in the second direction.

5 Claims, 6 Drawing Figures

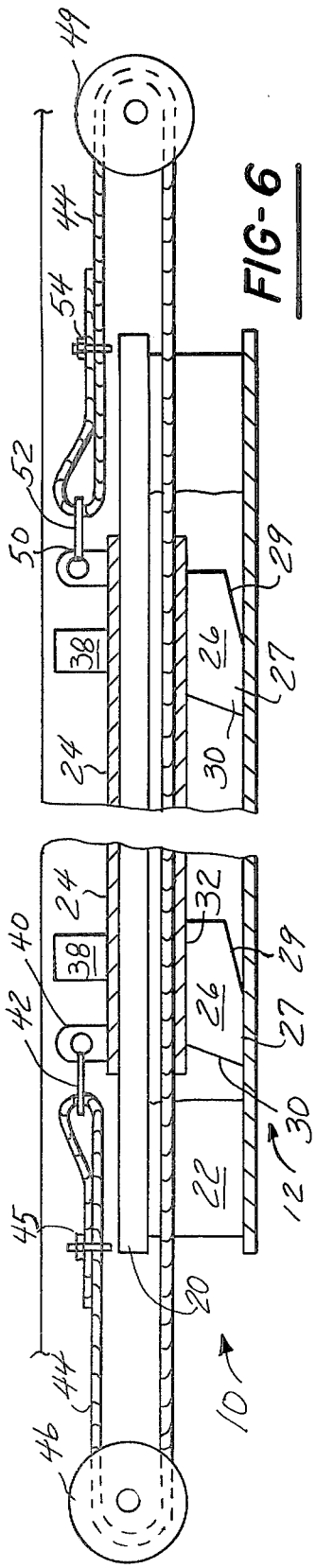
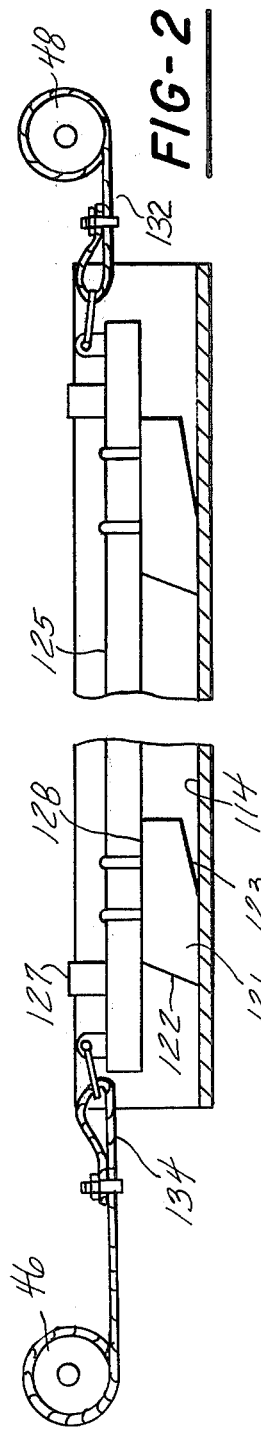
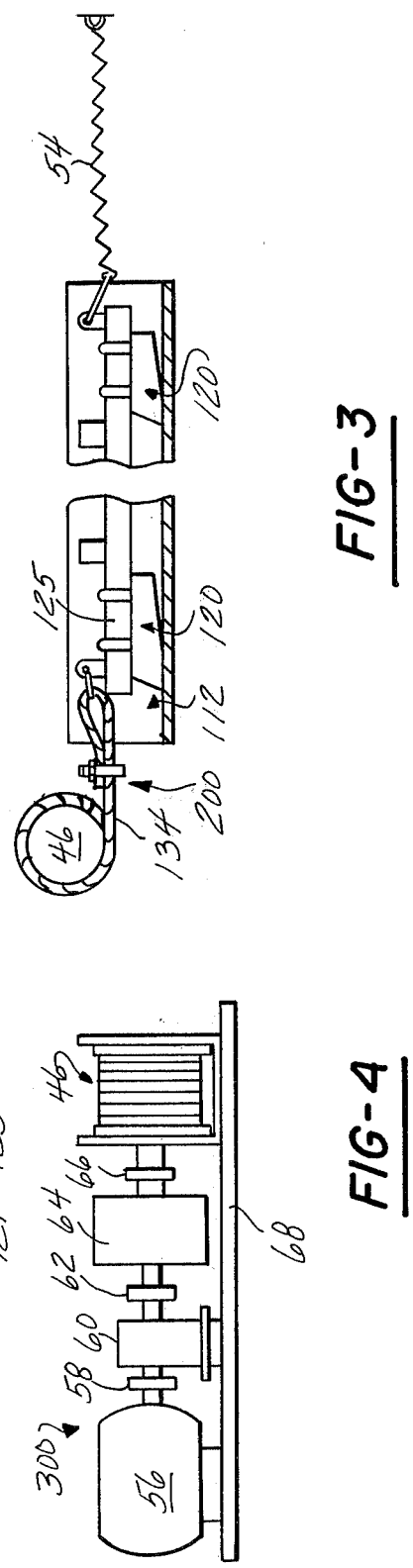
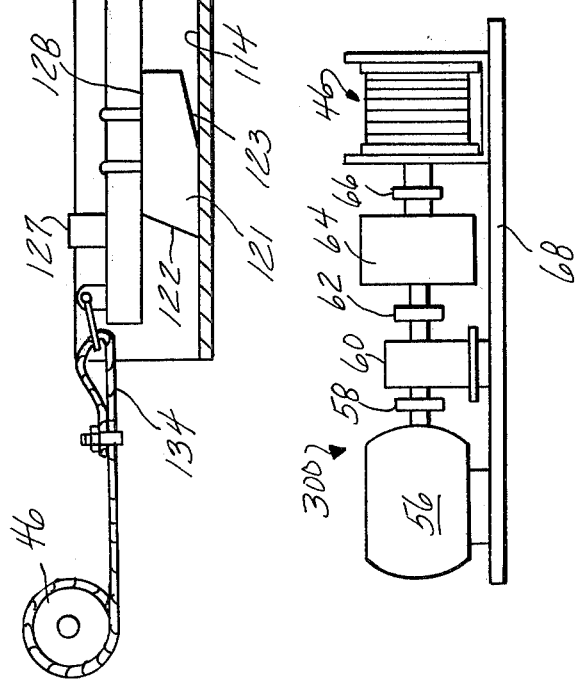

CABLE OR CHAIN ACTUATED CHIP CONVEYOR

BACKGROUND OF THE INVENTION

I. Field of the Invention

The present invention relates to the field of conveyors, and more particularly to the field of conveyors for moving materials longitudinally along a trough. Even more particularly the present invention relates to the field of conveyors for moving chips longitudinally along a conveyor trough using the reciprocating motion of a harpoon.

II. Description of the Prior Art

For many years reciprocating devices have been employed to move chips longitudinally along a trough. The more commonly used devices include a harpoon which moves freely through the chips in a first direction without displacing the chips in the direction of motion, and the harpoon urges the chips to move in the direction of the harpoon when the harpoon is moved in a counter direction. The reciprocating motion of the harpoon is generated by a hydraulic cylinder which alternately pushes and pulls the harpoon. When this method of reciprocating a harpoon is used for a particularly long conveyor system, buckling and binding of the harpoon support is often encountered which limits the weight of chips that can be conveyed and places unusually high horsepower demands on the reciprocating mechanism. Abrasive chips often collect along the rod of the hydraulic cylinder which induces rod wear and eventually causes the leakage of hydraulic fluid and requires frequent replacement of the hydraulic cylinder to keep the system functioning properly. It is to these and other problems that the present invention is addressed.

U.S. Pat. No. 147,523 discloses a log turner for saw mills. This patent discloses a rope or cable operated device which employs a plurality of segmented hooks attached to a cable or rope. When moved in a first direction the hooks engage the periphery of a log to rotate the log, and when moved in a second direction the hooks slide past the log imparting no rotary motion thereto. U.S. Pat. No. 937,192 discloses a lumber loader which is laterally moved by a chain cable or rope and employs a pair of spaced apart pivoted arms which when moved in a first direction fold under a stack of logs to pass therepast. When moved in a second direction, the arms are spring loaded in an upward direction to engage the logs urging them to move in the direction of the rope or cable pulling the arms. U.S. Pat. No. 3,659,701 discloses a cooling conveyor for continuously moving a line of molds from a mold forming machine by means of a continuous chain drive. U.S. Pat. No. 3,738,514 discloses a continuous belt conveyor for conveying bricks from a brick press into an adjacent shuttle car.

None of the above listed U.S. patents disclose nor anticipate a chain or cable driven harpoon for moving machining chips along a trough.

SUMMARY OF THE INVENTION

The present invention comprises a chip conveyor for moving machining chips. The conveyor comprises a trough for collecting chips, including a bottom wall and a pair of side walls; a harpoon movable along the bottom wall which when moved in a rearward direction through a pile of chips passes through the chips without displacing them in the direction of movement of the harpoon, and when moving in a forward direction, the harpoon displaces the chips in its direction of motion. A chain or cable means is used for urging the harpoon in the forward and the rearward directions.

A plurality of harpoons are affixed to a pipe in a spaced apart manner. The weight of the harpoon allows it to rest on a bottom wall of the trough without the use of guides.

The harpoon comprises a truncated pyramided shaped solid member having a vertical wall at its forward end and a truncated triangular shaped bottom wall which narrows longitudinally toward a rear end. A forward portion of the bottom wall is planar and horizontal to rest on the bottom wall of the trough. The rearward portion of the bottom wall extends upward toward a rear end thereof forming a wedging surface to lift the harpoon over chips when moving rearward. A top portion of the harpoon includes a semi-circular concave recess which provides a groove to accommodate the pipe. The harpoon is affixed to the pipe by one or more "U" bolt fasteners, welding, or the like. A plurality of spaced dorsal fins extend vertically from the pipe and are attached thereto by welding or the like.

The trough comprises a bottom wall integral with a pair of upward and outward extending side walls and a pair of vertical walls integral with the side walls. A plurality of forward leaning bars are spaced along the side walls. The forward leaning bars comprise a rectangular solid member which is attached to the trough by welding or the like. The forward leaning bars facilitate the forward movement of the chips and resist their rearward movement as the harpoon is moved in the rearward direction.

The first end of a first cable or chain extends from a forwardmost end of the pipe to a drum of a first capstan where one or more turns are looped around the drum. A first end of a second cable is attached to a rear end of the pipe and the second cable or chain is looped around a second capstan drum.

Rotation of the capstans in a first direction moves the first cable to pull the harpoon forward pushing chips in a forward direction. Rotation of the capstans in a counter direction causes the second cable to pull the harpoon rearward. The shape of the harpoon allows the harpoon to move rearward without dragging chips in the direction of movement of the harpoon. The forward leaning bars deployed along the side walls of the trough further discourage the rearward movement of the chips. Dorsal fins in the form of rectangular bars welded in a spaced apart manner along an upper portion of the pipe serve to further assist the forward movement of the chips.

For a more complete understanding of the present invention reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings like reference numbers refer to like parts throughout the several views, and wherein:

FIG. 2 illustrates a cross sectional view of the device of FIG. 1 taken longitudinally along the trough;

FIG. 3 illustrates a second embodiment of the present invention wherein the harpoon is moved in a counter direction by a spring means;

FIG. 4 illustrates the capstan and its prime mover and power train;

FIG. 6 illustrates a cross sectional view of the device of FIG. 5 taken longitudinally along the trough.

DESCRIPTION OF THE PREFERRED EMBODIMENT

Figure 1:
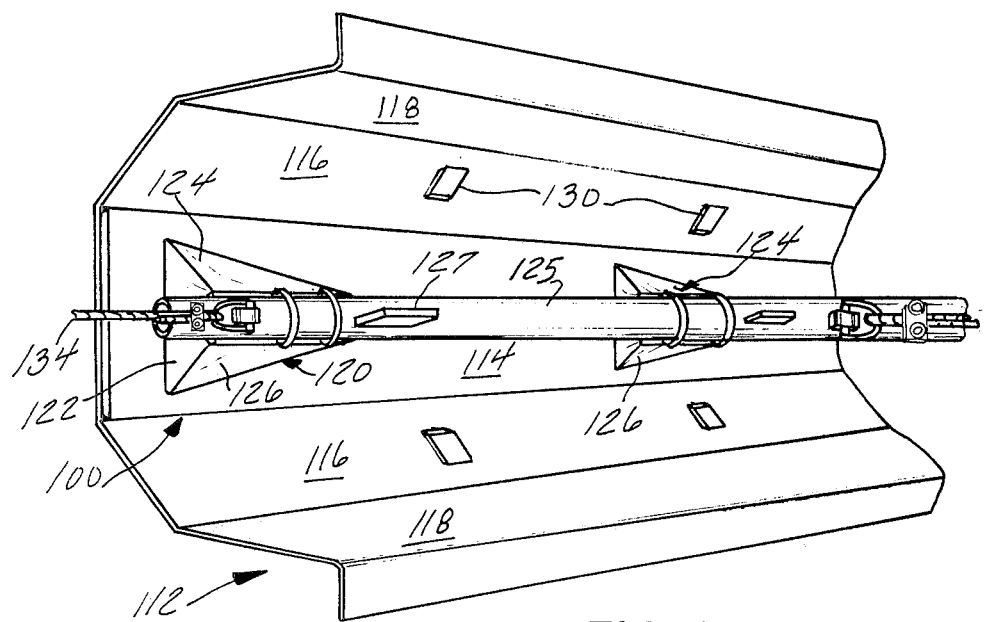
FIG. 1 illustrates a perspective view of the harpoon and cable of the present invention.

Referring now to the drawings and in particular to FIGS. 1 and 2 wherein there is illustrated a preferred embodiment of the present invention. The chip conveyor 100 of the present invention comprises a trough 112 including a bottom wall 114, a pair of upward and outwardly sloping side walls 116 integral with the bottom wall, and a pair of opposed vertical walls 118 integral with the side walls 116. A plurality of harpoons 120 are deployed along and rest upon the bottom wall 114.

The harpoon 120 comprises a truncated pyramidal shaped solid body with a truncated triangular shaped bottom wall narrowing longitudinally rearward. A portion of the harpoon bottom wall 121 is planar and horizontal resting on the bottom wall 114 of the trough. A forward wall 122 of the harpoon extends vertically upward from the base portion. A rearward portion 123 of the harpoon bottom wall extends upward toward the rear end thereby forming a wedging surface to lift the harpoon over the chips when moving rearward. A pair of opposed side walls 124, 126 begin at the sides of the truncated triangular bottom wall and extend upward and inward terminating at a horizontally extending ridge 128. The ridge 128 has a semi-circular concave shape along the top thereof to nestingly receive a pipe 125 which supports the harpoons 120 in a spaced apart manner. The shape of each harpoon 120 enables the harpoon to move chips along in the direction of the harpoon's motion when the harpoon is moved in a first or forward direction. When the harpoon 120 is moved in a second or rearward direction chips contained in the trough are pushed aside or the harpoon lifts over them so they do not move with the harpoon. A plurality of forward leaning bars 130 are deployed along the side walls 116. The bars 130 are mounted to the trough leaning forward by welding or a similar fastening means. The forward leaning of the bars inhibits the rearward motion of the chips while allowing an unobstructed forward motion. A plurality of dorsal fins 127 in the form of rectangular bars are spaced along a top portion of the pipe 125 in a spaced apart manner by welding or the like. The dorsal fins 127 further aid the forward movement of the chips.

A first cable 134 has a first end attached to a forward end of the pipe 125. The first end of the cable 134 is looped through a clevis attached to the pipe and folded back upon itself. The first end is then clamped to the cable forming a loop.

A second end of the cable 134 extends to a capstan 46 (FIG. 2) where the cable has one or more turns wrapped around a drum of the capstan 46. A second cable 132 has a first end attached to a rear end of the pipe 125. The second cable then loops one or more times over the drum of a second capstan 48 and is then attached to the drum.

Rotating the capstans 46,48 in a first direction moves the harpoons 120 forward urging chips contained in the trough to move in a forward direction. Rotating the capstans 46,48 in a counter direction moves the harpoons 120 rearward, the shape of the harpoon pushing any chips contained in the trough aside and not imparting a rearward motion thereto. The forward leaning bars 130 further inhibit any rearward migration of the chips and encourage and allow a free forward motion of the chips.

Referring now to FIG. 3 wherein there is illustrated a second embodiment of the present invention at 200. The first end of the cable 134 is looped one or more times around the drum of the capstan 46 and then affixed to the drum. A second end of the cable is affixed to a pipe 125 which has affixed thereto a plurality of spaced apart harpoons 120. A rear end of the pipe 125 is connected to a spring means 54 which biases the pipe in a rearward direction. Rotation of the capstan 46 in a first direction winds the cable 134 onto the capstan and urges the harpoons 120 in a forward direction pushing chips along therewith in the direction of motion. Rotation of the capstan 46 in a counter direction unwinds the cable 134 from the capstan 46 and the spring 54 urges the pipe 125 and the harpoons 120 in a rearward direction as the cable 134 unwinds. It is obvious to the skilled artisan that rotation of the capstan 46 in a first direction and then in a counter direction moves machining chips along the trough 112 in a forward direction.

Figure 5:
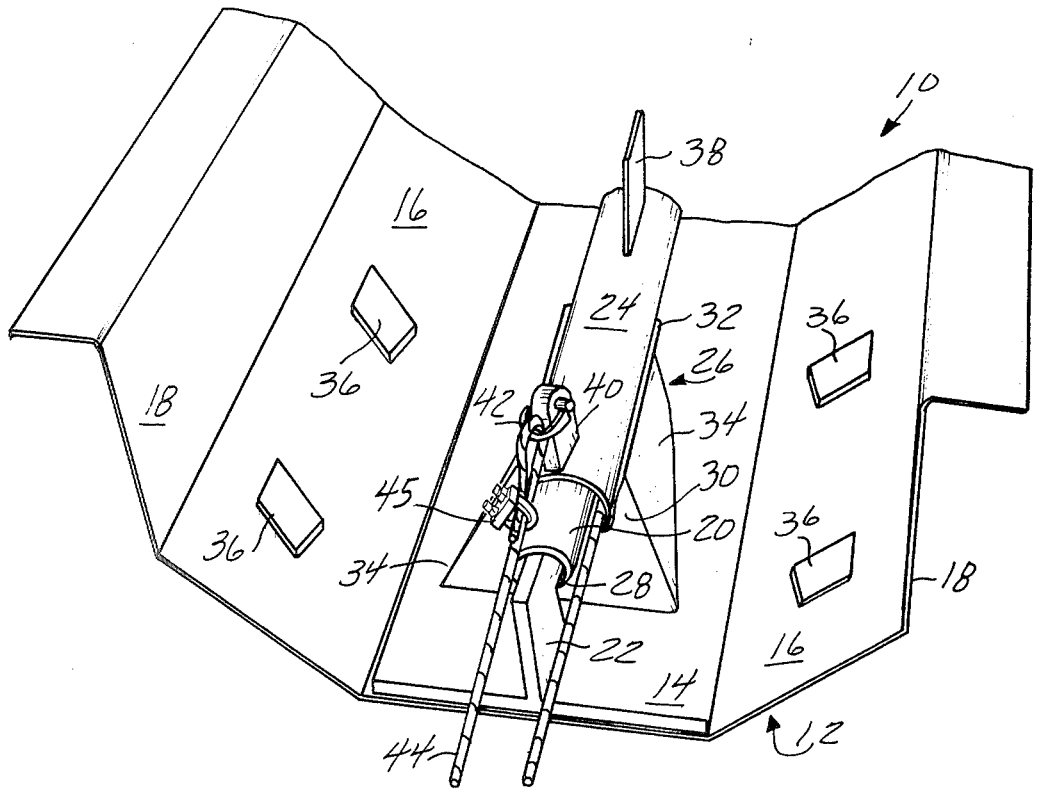
FIG. 5 illustrates a perspective view of a third embodiment of the present invention.

Referring again to the drawings and in particular to FIGS. 5 and 6 wherein there is illustrated at 10 a third embodiment of the present invention. The third embodiment comprises a trough 12 including a bottom wall 14, a pair of upward and outward extending side walls 16, integral with the bottom wall 14 and a pair of vertical walls 18, integral with the side walls 16. The bottom wall, the side walls, and the vertical walls cooperate to form a trough 12 with an open top into which chips can freely fall. An inner tube 20 extends longitudinally along the trough 12 and is supported along a central portion thereof. The inner tube 20 is spaced above the bottom wall 14 by a support 22 affixed along a lower edge to the bottom wall 14 and along an upper edge to the inner tube 20 by welding or other suitable means.

An outer tube 24 loosely surrounds the inner tube 20 and is supported along an inside surface thereof by the inner tube. The outer tube 24 supports along its lower surface one or more harpoons 26 which are affixed to the outer tube 24 by fasteners, welding, or other suitable means.

A longitudinal opening 28 extends along a bottom portion of the tube 24 through the harpoons 26 to provide clearance for the support 22. The harpoon 26 has a generally truncated pyramidal shape with a truncated triangular bottom wall which rests on the bottom wall 14 of the trough 12. A forward portion 27 of the harpoon bottom wall is planar and horizontal resting on the trough bottom wall. A rearward portion 29 of the bottom wall slants upward toward the rear forming a wedge to lift the harpoon over the chips as it moves rearward. The forward portion of the bottom wall of the harpoon joins a vertically extending forward wall 30 of the harpoon. An upper wall 32 of the harpoon has a circular concave configuration to nestingly abut an outside diameter of the outer tube 24 where the harpoon is affixed to the tube by fasteners, welding, or other suitable means. The harpoon 26 has a pair of side walls 34, extending from a tapered portion of the harpoon bottom wall to the upper wall 32 to enclose the structure of the harpoon 26. It is readily apparent to the skilled artisan that a forward motion of the harpoon 26 will push chips along in the direction of the harpoons motion due to the vertical face 30. A rearward motion of the harpoon 26 simply pushes the chips aside allowing the harpoon to freely move rearward due to the pointed shape of the rear portion of the harpoon 26. A plurality of forward leaning bars 36 are deployed along the side walls 16 of the trough 12. The forward leaning bars 36 further inhibit a rearward motion of the chips as the harpoon is moved rearward and the tapered shape of the wedges or bars 36 allow an unrestricted forward motion of the chips as the harpoon is moved forward. A plurality of dorsal fins 38 in the form of rectangular bars are deployed along a top edge of the outer tube 24 to aid the forward movement of the chips.

A front padeye 40 is affixed to a forward end of the outer tube 24 at a front portion thereof pointing vertically upward from the tube. The padeye is affixed to the tube 24 by suitable means such as welding. An aperture through the padeye 40 pivotally receives a clevis 42, the clevis 42 has threaded through its closed end the first end of a cable 44. The first end of the cable or wire rope 44 is folded back on itself and clamped together with a clamp 45 or other suitable means. The cable 44 is then looped one or more times around the drum of a capstan 46 (FIG. 6). The cable 44 is then threaded through a space between the inner and outer tubes to a pulley 49 at a rear end of the conveyor 10. A rear padeye 50 is affixed to a rear end of the outer tube 24 by welding or the like and has an aperture therethrough to swively receive a second clevis 52. A second end of the cable 44 is threaded through the clevis 52 and folded back on itself and clamped to the cable 44 with a cable clamp 54 to form a loop. Rotation of the capstan drum 46 in a first direction pulls the harpoon 26 in a forward direction to move machining chips along therewith. Rotation of the capstan drum in a counter direction moves the harpoon 26 in a rearward direction, the shape of the harpoon pushes the chips aside and prevents the movement of the chips in the rearward direction.

Referring again to the drawings and in particular to FIG. 4 wherein there is illustrated at 300 a preferred embodiment of the power train for the driving of the capstans 46,48. A reversible electric motor 56 is interconnected to an electrical power source (not shown) by an electrical reversing switch (also not shown). The reversible electric motor 56 is coupled to a clutch 60 by means of a coupling 58. The motor is declutched from the drive train during starting and reversing to reduce the load on the motor and switching mechanism. The output of the clutch 60 is coupled to the input of a gear reducer 64 by means of a second coupling 62. The output of the gear reducer 64 is coupled to the input of the capstan 46 by means of a third coupling 66. The reversible motor 56, the clutch 60, the reducer 64, and the capstan 46 are mounted in alignment with one another utilizing a mounting plate 68.

There has been described hereinabove a chip conveyor for efficiently and reliably conveying chips along a trough for disposal at an end thereof. The present invention employs a cable or chain to pull the harpoon in a forward direction and in a rearward direction. The shape of the harpoon urges the chips contained within the trough to move only in the forward direction. By pulling the harpoon in a forward direction then in a rearward direction by means of a cable or chain, the problem of binding, buckling, and high horse power consumption of conventional chip conveyor systems is overcome.

Having thus described the invention what is claimed is:

1. A conveyor for moving items comprising:
    a trough for collecting items including a bottom wall and a pair of side walls;
    a harpoon which when moving in a rearward direction through a pile of chips passes through the chips without displacing the chips in the direction of movement of the harpoon, and when moving in a forward direction displaces the chips in the direction of movement of the harpoon; and
    a cable or chain means for urging the harpoon in the rearward direction and the forward direction said cable or chain means comprising:
    a first capstan;
    first means for rotating the first capstan in a first direction and a counter direction;
    a first end of a first cable looped one or more turns around the capstan and affixed thereto;
    a central portion of the first cable affixed to one end of the harpoon;
    a second capstan;
    second means for rotating the second capstan in a first direction and a counter direction;
    a first end of a second cable looped one or more turns around the second capstan and affixed thereto;
    a central portion of the second cable affixed to the other end of the harpoon;
    wherein rotating the first and second capstans in a first direction moves the harpoon in the forward direction, and rotating the first and second capstans in a counter direction moves the harpoon in the rearward direction.

2. The conveyor as defined in claim 1 further comprising:
    one or more harpoons supported by the bottom wall; and
    a pipe joining the harpoons together in a spaced apart manner.

3. The conveyor as defined in claim 1 wherein each of the first and second means for rotating the first and second capstans in a first direction and a counter direction comprising:
    a reversible electric motor;
    a reversing switch electrically interposed between a power source and the motor;
    a gear reducer having an input shaft and an output shaft;
    a clutch means for selectively interconnecting the motor and the input shaft; and
    the capstan rotatingly driven by the output shaft.

4. A conveyor for moving items comprising:
    a trough for collecting items including a bottom wall and a pair of side walls;
    a harpoon which when moving in a rearward direction through a pile of movement of chips passes through the chips without displacing the chips in the direction of movement of the harpoon, and when moving in a forward direction displaces the chips in the direction of the harpoon; and
    a cable or chain means for urging the harpoon in the rearward direction and the forward direction, wherein the cable or chain means for urging the harpoon in the forward direction and the rearward direction comprises:

a capstan including a drum;

means for rotating the capstan in a first direction and a counter direction;

a first end of the cable looped one or more turns around the drum of the capstan and affixed thereto;

a central portion of the cable affixed to the harpoon;

a spring means affixed to a rear end of the harpoon and biasing the harpoon rearward; and wherein rotating the capstan in a first direction winds the cable on the drum moving the harpoon in the forward direction against the spring means, and rotating the capstan in a counter direction unwinds the cable from the drum allowing the spring means to pull the harpoon in the rearward direction.

5. A conveyor for moving items comprising:

a trough for collecting items including a bottom wall and a pair of side walls;

a harpoon which when moving in a rearward direction through a pile of chips passes through the chips without displacing the chips in the direction of movement of the harpoon, and when moving in a forward direction displaces the chips in the direction of movement of the harpoon; and a cable or chain means for urging the harpoon in the rearward direction and the forward direction, said cable or chain means comprising:

a first capstan;

one or more turns of cable or chain looped around the capstan;

a portion of the cable affixed to one end of the harpoon;

first means for rotating the first capstan in a first direction and in a counter direction, and a second capstan;

one or more turns of said cable or chain looped around the second capstan;

a portion of the cable affixed to a second end of the harpoon;

second means for rotating the second capstan in a first direction and in a counter direction; and wherein rotating the first and second capstans in a first direction moves the harpoon in the forward direction, and rotating the first and second capstans in a counter direction moves the harpoon in the rearward direction.

* * * * *